United States Patent [19]

Kobiske

[11] 4,028,017

[45] June 7, 1977

[54] MANURE PUMP HAVING AGITATOR PISTON

[75] Inventor: Gerald F. Kobiske, Loyal, Wis.

[73] Assignee: Kobiske Industries, Inc., Loyal, Wis.

[22] Filed: Mar. 26, 1976

[21] Appl. No.: 670,753

[52] U.S. Cl. .............................. 417/489; 417/900; 92/166; 92/177

[51] Int. Cl.² ......................................... F04B 7/04

[58] Field of Search ................. 417/551, 900, 489; 92/177, 166; 222/409

[56] References Cited

UNITED STATES PATENTS

| | | | |
|---|---|---|---|
| 445,413 | 1/1891 | Sausser | 92/177 |
| 636,713 | 11/1899 | Branley | 92/178 |
| 1,301,485 | 4/1919 | Mueller | 417/900 |
| 1,552,083 | 9/1925 | Riley et al. | 222/409 |
| 3,592,131 | 7/1971 | Otsuka | 92/166 |
| 3,872,981 | 3/1975 | Hedlund | 417/551 |
| 3,876,341 | 4/1975 | Nesseth | 417/900 |

Primary Examiner—William L. Freeh
Attorney, Agent, or Firm—Merchant, Gould, Smith, Edell, Welter & Schmidt

[57] ABSTRACT

A hopper having a bottom opening into an open topped chamber portion of a housing which defines a discharge passageway leading from the chamber to a discharge end portion. A piston is mounted for reciprocatory movements in the chamber portion and passageway. The piston having a pumping surface normal to the direction of its movement and facing the discharge end portion of the passageway. The piston has an opposite surface which slopes angularly upwardly toward the pumping surface. A check valve is disposed in the passageway at the discharge end portion of the passageway.

5 Claims, 4 Drawing Figures

MANURE PUMP HAVING AGITATOR PISTON

SUMMARY OF THE INVENTION

This invention relates to devices for mixing and feeding of fertilizer in the form of manure, particularly animal manure, and involves a supply hopper having an open bottom, a generally horizontally extending housing having one end supporting the hopper and defining an open topped chamber in register with the open bottom of the hopper and a generally horizontal discharge passageway leading from the chamber and having a discharge end portion. A piston is reciprocably movable in the chamber and passageway, and has a generally flat pumping surface facing the discharge end portion of the passageway, the pumping surface being disposed in a plane normal to the direction of movement of the piston. The piston has an opposite material mixing surface sloping upwardly toward the pumping surface. Support means is provided for guiding the piston for reciprocatory pumping and return movements in said chamber and said passageway, and means is provided for imparting said reciprocatory movements to the piston. Check valve means in the housing normally closes the discharge end of the passageway.

DETAILED DESCRIPTION OF THE PREFERRED EMBODIMENT

Figure 2:
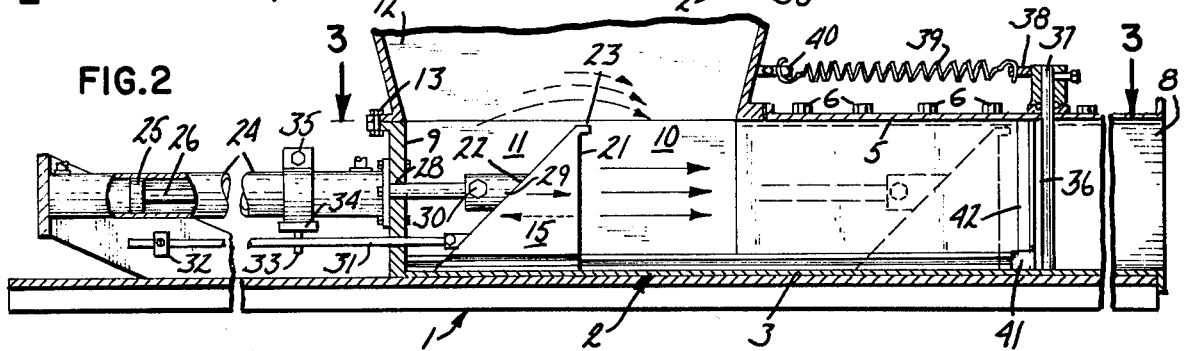
FIG. 2 is an enlarged fragmentary longitudinal section taken substantially on the line 2—2 of FIG. 1.
Figure 3:
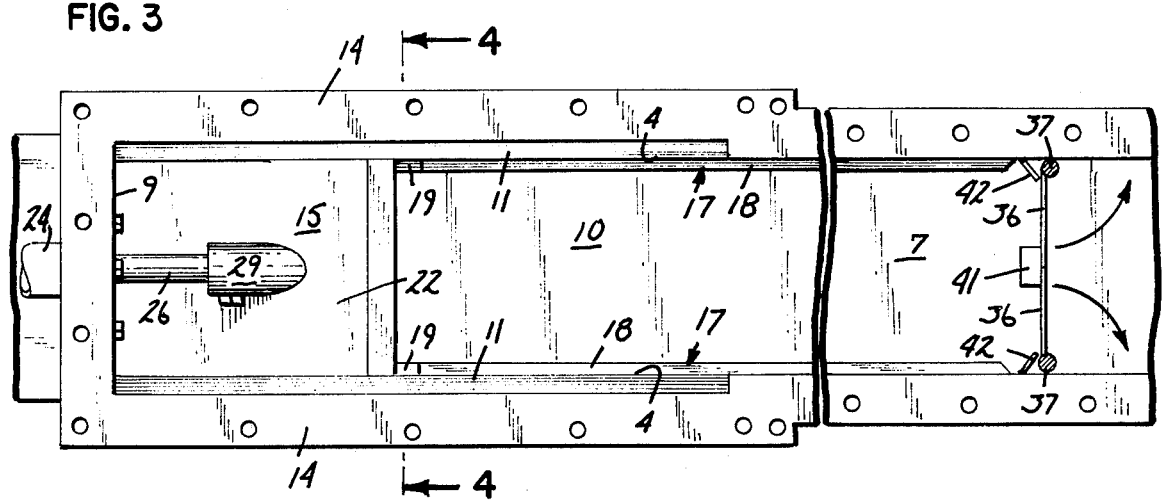
FIG. 3 is a still further enlarged fragmentary view, partly in top plan and partly in section, taken on the line 3—3 of FIG. 2.
Figure 4:
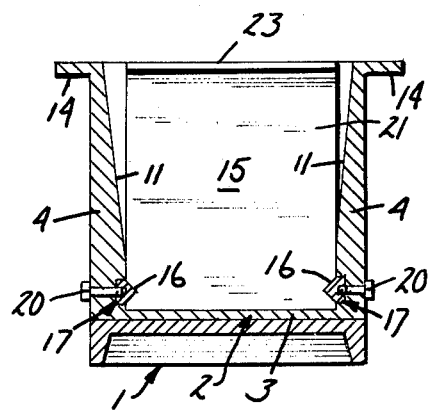
FIG. 4 is a transverse section taken on the line 4—4 of FIG. 3.

An elongated base member 1 has mounted thereon a longtiudinally extending housing 2 having a bottom wall 3, laterally spaced parallel side walls 4, and a removable top wall 5 that is secured to the upper edges of the side walls 4 by means of machine screws or the like 6. As shown, the top wall 5 covers one end portion of the housing 2 and cooperates therewith to define longitudinally extending cross-sectionally rectangular passageway 7. A flanged discharge pipe 8 is secured to the outer end of the housing 1 to provide an extension for the passageway 7. The inner end of the housing 2 is defined by a transverse end wall 9 which cooperates with the adjacent end portion of the bottom wall 3 and side walls 4 to define an upwardly opening material receiving chamber 10, the inner side wall surfaces 11 of which diverge upwardly, as shown particularly in FIG. 4. Also, as shown, the passageway 7 is disposed in alignment with the chamber 10. A material feeding hopper 12 overlies the chamber 10, and is rigidly secured to the side and end walls 4 and 9 by suitable means such as nut-equipped screws 13, the hopper 12 having an open bottom for feeding directly into the chamber 10. As shown in FIGS. 2—4, the housing 2 is provided with an upper marginal flange 14 to which the top wall 5 and hopper 12 are secured.

A pumping piston 15 is disposed in the housing 2 for movements longitudinally of the chamber 10 and passageway 7, the piston being provided at its opposite sides with grooves 16 for slidably receiving a pair of opposed guide rails 17 mounted on the inner surfaces of the housing side walls 4. The guide rails 17 each comprise aligned guide rail sections 18 and 19, the former of which may be assumed to be a part of the side walls 4, the latter being removably mounted in the side walls 4 of the chamber portion 10 by suitable means such as machine screws or the like 20, see FIG. 4. The piston 15 is formed to provide a flat transverse wall or pumping surface 21 disposed in a plane normal to the direction of movement of the piston, and an opposite material mixing surface 22 that slopes upwardly from the bottom wall 3 of the housing 2 toward the pumping surface 21, as shown in FIG. 2. At its top portion, the piston 15 is formed to provide a flange 23 that projects forwardly from the pumping surface 21 and which extends laterally for the entire width of the piston 15.

Reciprocatory movement is imparted to the piston 15 longitudinally of the chamber 10 and passagway 7 by means of a fluid pressure operated cylinder 24, and a cooperating piston 25 and piston rod 26. The cylinder 24 is mounted at one end to the end wall 9 and at its opposite closed end to a bracket 27 welded or otherwise rigidly mounted on the base member 1. The piston rod 26 extends through an opening 28 in the housing end wall 9 and is rigidly secured in a boss 29 in the piston 15 by means of a set screw or the like 30. In FIG. 2, a control rod 31 is shown as being connected at one end to the piston 15, the control rod 31 slidably extending through a suitable opening in the end wall 9 and having mouted thereon a trip member or collar 32 that is adapted to engage the switch operating levers 33 of a pair of switches 34 mounted on supporting brackets 35 on the cylinder 24. The switches 34, one of which is shown, are adapted to control fluid pressure to the cylinder 24 from pumping and valve mechanism not shown, such apparatus being well known and not in and of itself comprising the instant invention. Hence, for the sake of brevity, further detailed showing and description of the switch 34 and apparatus controlled thereby is omitted. It should be sufficient to state that the switches 34 are reversing switches operative to effect reversal of the direction of movement of the piston 15 at opposite ends of its reciprocatory movement.

Figure 1:
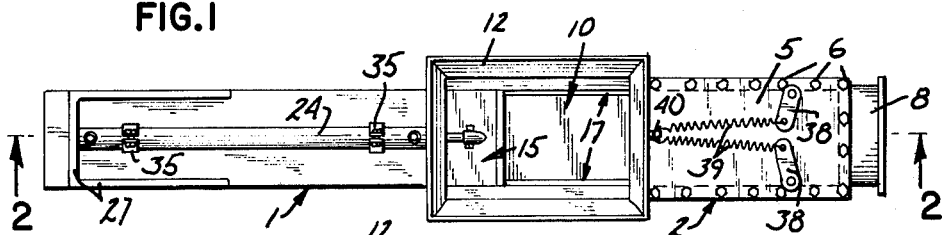
FIG. 1 is a view in top plan of a manure pump produced in accordance with this invention.

Check valve means at the discharge end portion of the passageway 7 comprises a pair of valve plates 36 mounted on rotary shafts 37 that are journaled in the top and bottom walls 5 and 3 respectively of the housing 2, adjacent the opposite side walls 4 thereof. The shafts 37 extend upwardly through the top wall 5 and are provided at their upper ends with actuating arms 38 that extend radially outwardly therefrom and which at their outer ends are connected to the outer ends of a pair of coil tension springs 39, the inner ends of which are connected to an anchoring screw eye or the like 40 secured to the hopper 12. The springs 39 yieldingly urge the shafts 37 in a direction of rotation to bring the valve plates 36 into a valve closed position wherein the plates 36 extend transversely of the passageway 7 and engage a stop block or the like 41 which limits movement of the valve plates 36 beyond their valve closed position shown by full lines in FIG. 3. A pair of guide plates 42 are welded or otherwise rigidly secured to the inner surfaces of the side walls 4 adjacent the valve shafts 37 to prevent material from collecting between the valve shafts 37 and the adjacent portions of the walls 4 and interfering with free rotation of the shafts 37. During operation of the above-described apparatus, material such as manure fed to the hopper 12, descends by gravity into the chamber 10 between the piston 15 and the passageway 7, as well as on to the surface 22 of the piston 15. As the piston 15 moves toward the discharge end of the passageway 7, the flange 23 tends to cut the material forwardly thereof from the overlying material in the hopper 12 and tends to prevent material from moving uply from the chamber 10 and into the hopper 12, in front of the piston 15. As the piston 15 moves toward the outlet end, the material from the hopper 12 descends into the chamber 10 behind the piston 15. The material in front of the piston 15 packs against the valve plates 36 and moves the plates 36 to an open position wherein the plates 36 lie against their respective housing side walls 4, against bias of the springs 39. Thus, during the pumping stroke of the piston 15, in a direction from the left to the right with respect to FIGS. 1–3, material is forced outwardly through the discharge pipe 8. Then, as the piston moves rearwardly toward the chamber 10, the valve plates 36 are moved to their valve closed positions by the springs 39. As the piston 15 moves rearwardly into the chamber 10, the material between the piston 15 and inner end wall 9 is cammed upwardly by the mixing surface 22, as shown by dotted arrows in FIG. 2, the material from the chamber 10 mixing with other material in the lower portion of the hopper 12 and being deposited with that material into the chamber 10 between the piston 15 and passageway 7. This process is repeated as long as reciprocatory movement is imparted to the piston 15. Thus, the piston 15 not only serves as a feeding and mixing element, but it also eliminates the necessity for other valve means between the hopper 12 and the chamber 10. During the return mixing stroke, the resultant agitation of the material in the lower portion of the hopper 12 effectively prevents the material in the hopper from bridging, and insures a free descent of the material downwardly into the chamber 10.

When it is desired to remove the piston 15 from the housing 2, it is only necessary to cause the same to be moved toward the passageway 7, after which the removable guide rail sections 19 may be disconnected from the side walls of the housing. When the sections 19 are thus removed, the piston 15 may be retracted to its position shown in FIG. 2, disconnected from the piston rod 26 and raised upwardly from the housing 2 through the hopper 12. With the piston 15 removed, the interior of the housing 26 may be cleaned or otherwise services along with the piston 15.

While I have shown and described a commercial embodiment of my manure pump and agitating piston therefor, it will be understood that the same is capable of modification without departure from the spirit and scope of the invention, as defined in the claims.

What is claimed is:

1. A manure pump comprising:

a. a supply hopper having an open bottom;
    b. a generally horizontally extending housing having one end supporting said hopper and defining an open topped chamber in register with the open bottom of said hopper and a generally horizontal discharge passageway leading from said chamber and having a discharge end portion;
    c. a piston reciprocably movable in said chamber and passageway and having a generally flat pumping surface facing said discharge end portion of the passageway said pumping surface being disposed in a plane normal to the direction of movement of the piston, and an opposite material mixing surface angularly displaced from said plane and sloping upwardly toward said pumping surface;
    d. guide means guiding said piston for reciprocatory pumping and return movements in said chamber and said passageway;
    e. means for imparting said reciprocatory movements to said piston;
    f. and check valve means in said housing normally closing said discharge end of the passageway.

2. The manure pump defined in claim 1 in which said check valve means comprises, a pair of cooperating valve plates, shaft means pivotally mounting said valve plates in said housing for swinging movements between valve open and valve closed positions in said passageway, and yielding means urging said valve plates toward said closed positions thereof.

3. The manure pump defined in claim 2 in which said shaft means comprises a pair of pivot shafts journaled in said housing at opposite sides of said passageway, said shafts each being secured to a different valve plate and each having an end extending through said housing, said yielding means comprising a pair of springs, each operatively connected to a different one of said shaft ends, said valve plates being moved to their valve open positions against bias of said springs responsive to piston imparted pressure of material against plates.

4. The manure pump defined in claim 1 in which said passageway is cross sectionally rectangular, said guide means comprising a pair of guide rails each mounted on an opposite side of said chamber and passageway and extending longitudinally of the direction of travel of the piston, said piston conforming in outline generally to the cross sectional shape of said passageway and having opposite flat sides defining channels for slidably receiving said guide rails, each guide rail including a pair of aligned rail sections one section of each pair being secured to said housing within said chamber for easy removal therefrom.

5. The manure pump defined in claim 4 in which said piston has an upper edge portion providing a flange projecting in the direction of said pumping movement of the piston.

* * * * *